US012809409B2

(12) United States Patent
Geyari et al.

(10) Patent No.: US 12,809,409 B2
(45) Date of Patent: Nov. 24, 2026

(54) WAKEUP CIRCUIT WITH PEAK CURRENT CONTROL AND BREAKDOWN VOLTAGE CONTROL FOR LOW DROPOUT REGULATOR CIRCUIT

(71) Applicant: Infineon Technologies LLC, San Jose, CA (US)

(72) Inventors: Eran Geyari, Netanya (IL); Avri Harush, Herzliya (IL)

(73) Assignee: Infineon Technologies LLC, San Jose, CA (US)

( * ) Notice: Subject to any disclaimer, the term of this patent is extended or adjusted under 35 U.S.C. 154(b) by 140 days.

(21) Appl. No.: 18/891,950

(22) Filed: Sep. 20, 2024

(65) Prior Publication Data

US 2025/0390127 A1 Dec. 25, 2025

Related U.S. Application Data

(60) Provisional application No. 63/662,111, filed on Jun. 20, 2024.

(51) Int. Cl.
*G05F 1/56* (2006.01)

(52) U.S. Cl.
CPC .................................... *G05F 1/562* (2013.01)

(58) Field of Classification Search
CPC ............... G05F 1/562; G05F 1/56; G05F 1/46
See application file for complete search history.

(56) References Cited

U.S. PATENT DOCUMENTS 10,866,607 B1 12/2020 Avci et al.
11,703,898 B2 * 7/2023 Georgievski ............ G05F 1/575 323/266
2005/0286322 A1 12/2005 Choi et al.
2018/0278215 A1 9/2018 Wang et al.
2025/0390130 A1 * 12/2025 Geyari .................... G05F 1/575

OTHER PUBLICATIONS

International Search Report and Written Opinion of the International Searching Authority for International Application No. PCT/US25/33234 dated Aug. 7, 2025; 12 pages.

* cited by examiner

*Primary Examiner* — Adolf D Berhane

(57) ABSTRACT

Technologies related to transient response of low dropout regulator (LDO) circuits are described. The LDO circuit has a lower standby output voltage and a greater active output voltage. When transitioning to the greater active output voltage, a wakeup circuit controls peak current between voltage supply and LDO output.

18 Claims, 6 Drawing Sheets

WAKEUP CIRCUIT WITH PEAK CURRENT CONTROL AND BREAKDOWN VOLTAGE CONTROL FOR LOW DROPOUT REGULATOR CIRCUIT

CROSS-REFERENCE TO RELATED APPLICATIONS

This application claims the benefit of U.S. Provisional Application No. 63/662,111, filed Jun. 20, 2024, the entire contents of which are incorporated herein by reference.

BACKGROUND

Electronic circuits may include individual electronic components, such as resistors, transistors, and capacitors, among others, connected by conductive wires or traces through which electric current can flow. Electronic circuits may be constructed using discrete components, or more commonly integrated in an integrated circuit (IC) where the components and interconnections are formed on a common substrate, such as silicon.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
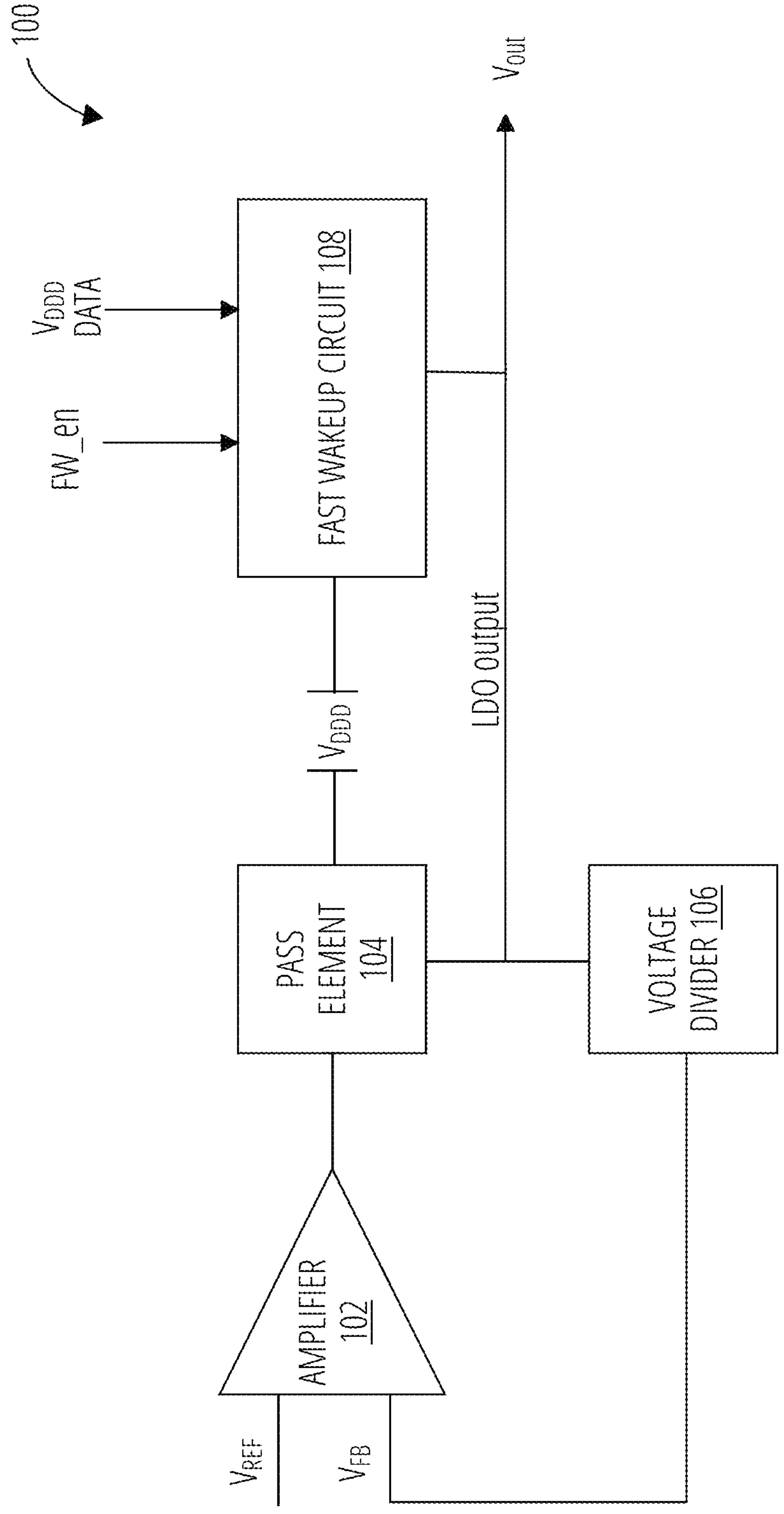
FIG. 1 illustrates a low dropout (LDO) regulator circuit, according to one embodiment.

Technologies related to transient response of low dropout regulator (LDO) circuits are described. In general, an LDO is designed to provide a stable output voltage with a small difference (low dropout voltage) between input and output voltages. LDOs are commonly used in many different products, including flash memory products, microcontrollers, smartphones, wearable devices, and other battery-powered electronics. Different markets may have different requirements; for example, in the medical field, flash products may have low leakage current requirements, which can lead to lowering a standby voltage level of the LDO. In the industrial field, flash products may have fast sensing requirements, which may lead to a higher active voltage of the LDO. Together, these requirements can pose a challenge to LDO design, as low standby voltage and high active voltage can lead to slower LDO wakeup times. Decreasing LDO wakeup time can lead to significant overshoots into breakdown voltage levels that can stress components of the LDO such as low voltage transistors. Risk of overshoot can be particularly high in the event that the LDO stays in standby for a short amount of time. Thus, there stands a need for an LDO solution that allows for faster wakeup times while avoiding substantial risk of overshooting into breakdown voltage levels of the LDO.

Aspects and embodiments of the present disclosure address the problems and challenges addressed above by providing a wakeup circuit that can control peak current to LDO output during wakeup (i.e., during transition between a standby voltage level (e.g., first voltage level) and an active voltage level (e.g., second voltage level). By controlling this peak current, the wakeup circuit can selectively modify a transition rate between standby and active output voltage levels of an LDO. In some embodiments, to control this peak current, the wakeup circuit can selectively adjust an effective impedance between a voltage supply and the LDO output. By adjusting this impedance, the wakeup circuit can selectively modify (i.e., increase or decrease) the transition rate of the LDO output voltage. In scenarios where the voltage supply is higher, the wakeup circuit can increase this impedance. In scenarios where the voltage supply is lower, the wakeup circuit can decrease this impedance. By controlling the peak current to the LDO output, aspects and embodiments of the present disclosure can reduce or eliminate the risk of overshoot while also decreasing wakeup time.

Aspects and embodiments of the present disclosure may also provide systems and/or methods enable and disable the wakeup circuit. In some embodiments, the wakeup circuit can be enabled upon receiving a signal indicating that the LDO is to switch from a standby mode to an active mode and can be disabled upon the voltage level of the LDO output reaching a threshold voltage level (e.g., a trip point voltage). Disabling the wakeup circuit at the threshold voltage level can help reduce or eliminate the risk of overshoot and damaging the circuit. Upon disabling the wakeup circuit, normal operation of the LDO may resume (e.g., output voltage may be increased or decreased based on output of an error amplifier).

FIG. 1 illustrates a low dropout regulator (LDO) circuit 100, according to one embodiment. In general, LDO circuits are designed to maintain a constant output voltage while minimizing the difference between the input voltage and the output voltage. This difference between input and output voltage may be referred to as the dropout voltage. An LDO circuit may typically include several different components that facilitate its operation, such as an error amplifier and a feedback loop. The error amplifier may compare the LDO output voltage with a reference voltage to maintain voltage stability and accuracy. This reference voltage may change depending on whether the LDO (or chip to which the LDO belongs) is in a standby mode or an active mode. The feedback loop may typically be employed to adjust the LDO output voltage based on changes in load or input voltage. In at least some embodiments, the feedback loop may include a voltage divider. Additional components that may also be commonly found in LDO circuits include a pass element (e.g., a transistor) that regulates the current flow; a compensation network to facilitate stability; and various protection features like overcurrent and thermal shutdown mechanisms. While the configuration of LDO regulators may vary to suit specific applications, the aspects and embodiments of the present disclosure are applicable to any LDO that transitions between standby and active modes.

As illustrated, the LDO circuit 100 may include at least an amplifier 102, a pass element 104, and a voltage divider 106 that form a feedback loop. This feedback loop may generate a feedback voltage $V_{FB}$ that is compared by the amplifier 102 to a reference voltage $V_{REF}$. The feedback voltage $V_{FB}$ may be a fraction of an LDO output voltage $V_{OUT}$. During normal operation of the LDO circuit 100 (i.e., while the wakeup circuit 108 is not enabled), the amplifier 102 may output an error signal proportional to any difference between the feedback voltage $V_{FB}$ to the reference voltage $V_{REF}$. This error signal may be directly related to the stability of the LDO output voltage $V_{OUT}$ despite any variations in load or supply voltage $V_{DDD}$. In some embodiments, the amplifier 102 may be an error amplifier. In other embodiments, the amplifier 102 may be any suitable type of amplifier that may be used in an LDO circuit. The pass element 104 may be comprised of any component(s) that allow a current to flow based on an independent control signal. For example, the pass element 104 may be one or more a group of components, including but not limited to transistors, relays, diodes, flip-flops (FFs), multiplexers, and the like. The voltage divider 106 may be any group of component(s) that split a voltage into a smaller voltage. In many cases, voltage dividers comprise two in-series resistors. However, the voltage divider 106 may include other suitable components, such as such as potentiometers, capacitors, thermistors, varistors, or the like.

The LDO circuit 100 may also include a fast wakeup or wakeup circuit 108. The wakeup circuit 108 may be configured to decrease a wakeup time from a standby mode of the LDO circuit 100 to an active mode of the LDO circuit 100. During standby mode, the LDO output voltage $V_{OUT}$ may be maintained at or near a lower voltage level (e.g., a first voltage level) than during active mode. The LDO circuit 100 may maintain this lower voltage level during standby mode to limit leakage current (i.e., to improve energy efficiency or conserve battery power). When transitioning from standby mode to active mode, the LDO circuit 100 may transition the LDO output voltage $V_{OUT}$ from this lower voltage level to a higher operational voltage level (e.g., a second voltage level). The wakeup circuit 108 may be enabled to facilitate this transition. In some embodiments, the wakeup circuit 108 can shorten a duration of this transition from the lower to higher voltage level, which decreases wakeup time for the LDO circuit 100 and, in embodiments where the LDO circuit 100 is part of a chip with other components or circuits, decreases wakeup time for the chip.

In some embodiments, the wakeup circuit 108 may control a peak current supplied to the LDO output voltage $V_{OUT}$ during the transition from standby mode to active mode. In at least one embodiment, the wakeup circuit 108 may include multiple parallel paths between the supply voltage $V_{DDD}$ and the LDO output (which carries the LDO output voltage $V_{OUT}$). These parallel paths may be enabled or disabled. By enabling a larger number of these parallel paths between the supply voltage $V_{DDD}$ and the LDO output voltage $V_{OUT}$, the wakeup circuit 108 can decrease an effective impedance seen by the supply voltage $V_{DDD}$ to the LDO output which increases the peak current during the transition from standby mode to active mode. By enabling a smaller number of these parallel paths between the supply voltage $V_{DDD}$ and the LDO output, the wakeup circuit 108 can increase the effective impedance between the supply voltage $V_{DDD}$ and the LDO output which decreases the peak current during the transition from standby mode to active mode. The wakeup circuit 108 may enable a number of these parallel paths based on a current voltage level (e.g., third voltage level) of the supply voltage $V_{DDD}$. In some embodiments, the current voltage level of the supply voltage $V_{DDD}$ may be represented by digital data. In at least one of these embodiments, this digital data may be a thermometer code (thermocode). In this context, this thermocode may be a binary representation of the current voltage level of the voltage supply. This thermocode may be carried by parallel lines, where each line represents a bit in the binary output of the digital conversion of the current voltage of the voltage supply. The below table represents possible exemplary 4-bit thermocodes representing the current voltage of the voltage supply:

TABLE 1

| Range of supply voltages (mV) | |
|---|---|
| <2300 | 0000 |
| 2300-2500 | 0001 |
| 2500-2700 | 0011 |
| 2700-2900 | 0111 |
| >2900 | 1111 |

In this exemplary embodiment, the wakeup circuit 108 may include at least five parallel paths that can each be selectively enabled based on one of the bits of the thermocode. For example, if the current voltage level of the supply voltage is 2100 millivolts (mV), all four of the parallel paths may be enabled. As another example, if the current voltage level of the supply voltage is 2400 mV, three of the parallel paths may be enabled while the fourth parallel path may be disabled.

One of skill in the art will appreciate that the above thermocodes described with respect to table (1) are meant solely as examples, and that thermocodes and their corresponding voltage ranges can widely vary. For example, a thermocode can have more or less than four bits and each range of voltages corresponding to a particular thermocode configuration can be smaller or greater than 200 mV. For example, if a high level of granularity within a particular supply voltage range is desired, the thermocode may be designed to have 50+ bits and corresponding parallel lines. In this scenario, the wakeup circuit 108 may include at least 50 parallel paths that are selectively enablable based on these bits. In at least one embodiment, ranges of supply voltages corresponding to a thermocode configuration may not share uniform widths. For example, a first range may be 2300-2500 mV, which has a width of 200 mV, while a second range may be 2500-2650 mV, which has a width of 150 mV. The widths of supply voltage ranges may be designed such that each additional parallel path that is enabled compensates for the increase in the current voltage level of the supply voltage $V_{DDD}$.

The wakeup circuit 108 may be enabled each time that the LDO transitions from the standby mode to the active mode. A signal, referred to as FW_en (wakeup enable), may be indicative of when the LDO transitions from the standby mode to the active mode. In at least one embodiment, the signal FW_en may be binary and have two states. While the signal FW_en is in a first state, the wakeup circuit 108 may be enabled and current may flow across the parallel paths enabled based on the current voltage level of the supply voltage $V_{DDD}$. While the signal FW_en is in a second state, the wakeup circuit 108 may be disabled and current may not flow across the parallel paths of between the supply voltage $V_{DDD}$ and the LDO output.

In some embodiments, the signal FW_en may be put into the first state (which enables the wakeup circuit 108) upon the LDO circuit 100 receiving an indication that the LDO circuit 100 is to transition from the standby mode to the active mode. In at least one of these embodiments, a chip select bar (CSB) signal may indicate when the LDO circuit 100 is to transition from the standby mode to the active mode. The signal FW_en may control a switch that, based on being open or closed, determines whether current is able to flow across the parallel paths of the wakeup circuit 108. In at least one embodiment, the signal FW_en is generated by a flip-flop (FF) that receives the CSB signal as a clock input or a clock enable input. This CSB signal may indicate when the LDO circuit 100 is to transition from the standby mode to the active mode.

In some embodiments, the signal FW_en may be put into the second state (which disables the wakeup circuit 108) once the LDO output voltage $V_{OUT}$ reaches a threshold voltage level. This threshold voltage level may also be referred to as a trip point voltage. The threshold voltage level may be determined based on the parameters or characteristics of the LDO circuit 100. In at least one embodiment, the threshold voltage level may be trimmable. For example, components such as any low-voltage transistors of the LDO circuit 100 may correspond to a breakdown voltage level. If the supply voltage $V_{DDD}$ is greater than this breakdown voltage level, these components of the LDO circuit 100 may be damaged. As such, the threshold voltage level may be predetermined in order to (i) allow the wakeup circuit 108 to decrease transition time between the standby and active modes of the LDO circuit 100 (wakeup time) and (ii) avoid supply voltage $V_{DDD}$ overshoot during this transition. In at least one embodiment, a comparator may compare the LDO output voltage $V_{OUT}$ to the threshold voltage level. Once the LDO output voltage $V_{OUT}$ reaches the threshold voltage level, the comparator may generate a signal that is used to disable the signal FW_en. In at least one embodiment, this comparator signal may be inputted into the FF such that the signal FW_en is transitioned from the first state to the second state. For example, this comparator signal may be inputted into a reset input of the FF such that the signal FW_en is reset (i.e., set to LOW ("0")).

The LDO circuit 100 may enter into standby mode for a variety of reasons, including but not limited to reducing power consumption, extending battery life, reducing current leakage, thermal management, or reducing load requirements of a chip or electronic system within which the LDO circuit 100 is disposed. In general, standby mode may extend the operational life or battery life of the device upon which the LDO circuit 100 is disposed. The LDO circuit 100 may be prompted to transition from standby mode to active mode when the LDO circuit 100 is used for any number of reasons, many of which are application specific. For example, the LDO circuit 100 may transition from standby mode to active mode upon receiving an increased load demand, during startup or power-on of the device upon which the LDO circuit 100 is disposed, battery charging, system diagnostics, response to external signals such as sensors or user inputs, temperature compensation, or the like. Irrespective of the reason, the CSB signal may generally be used by the LDO circuit 100 to determine when the LDO circuit 100 is to transition from standby mode to active mode.

Figure 2:
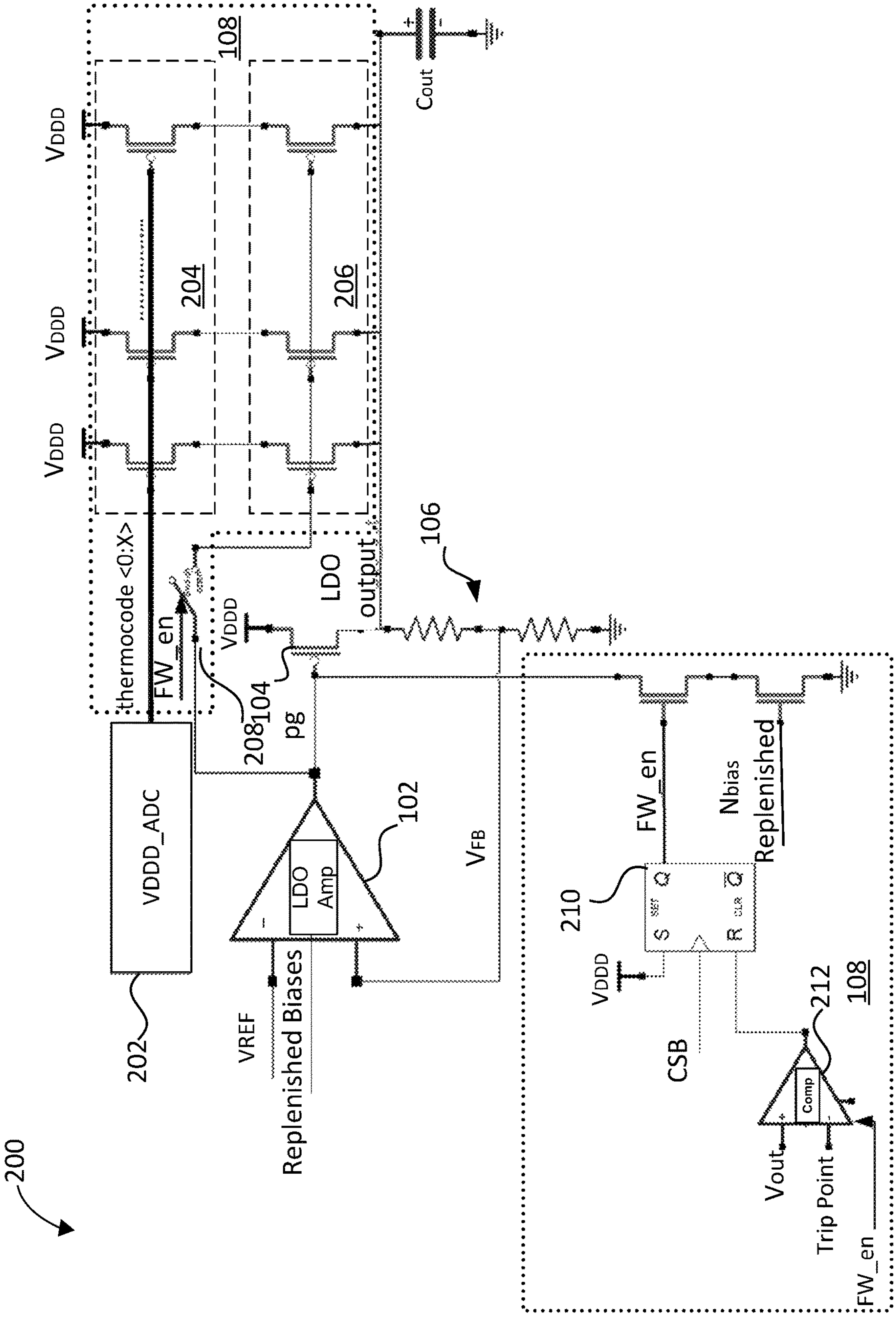
FIG. 2 illustrates an LDO regulator circuit, according to one embodiment.

FIG. 2 illustrates an LDO circuit 200, according to one embodiment. The LDO circuit 200 may include some or all of the features of LDO circuit 100 discussed herein. The LDO circuit 100 may include voltage supply data 202 that is used by the wakeup circuit 108 to control the peak current while the LDO circuit 200 transitions between standby mode (which has a lower LDO output voltage $V_{OUT}$) and active mode (which has a higher LDO output voltage $V_{OUT}$). The voltage supply data 202 may provide, in digital form, a current voltage of the supply voltage $V_{DDD}$. In at least one embodiment, the voltage supply data 202 may provide the current voltage of the supply voltage $V_{DDD}$ as a thermocode where each bit of the thermocode is carried by individual parallel lines <0:X>.

The wakeup circuit 108 may include a first set of pass elements 204 that each have a control terminal coupled to one of these parallel lines such that, based on the bits carried by the respective parallel lines, a first subset of pass elements of the first set of pass elements 204 are enabled and a second subset of pass elements of the first set of pass elements 204 are disabled. An input terminal of each of the pass elements of the first set of pass elements 204 may be coupled to the supply voltage $V_{DDD}$, while output terminals of each of the pass elements of the first set of pass elements 204 may be coupled to one of a second set of pass elements 206. In some embodiments, as the voltage level of the supply voltage $V_{DDD}$ increases, the number of pass elements of the first subset decreases. As the number of pass elements of the first subset decreases, the effective impedance between the supply voltage $V_{DDD}$ and the LDO output increases, which in turn weakens the peak current while the wakeup circuit 108 is enabled. In this scenario, because the peak current is weaker, the transition between LDO standby output voltage level (e.g., first voltage level) and LDO active output voltage level (e.g., second voltage level) is slower, which reduces or eliminates risk of overshoot beyond the breakdown voltage level. Similarly, in some embodiments, as the voltage level of the supply voltage $V_{DDD}$ decreases, the number of pass elements of the first subset increases. As the number of pass elements of the first subset increases, the effective impedance between the supply voltage $V_{DDD}$ and the LDO output decreases, which in turn strengthens the peak current while the wakeup circuit 108 is enabled. In this scenario, because the peak current is stronger, the transition between LDO standby output voltage level (e.g., first voltage level) and LDO active output voltage level (e.g., second voltage level) is faster, which shortens the wakeup time of the LDO circuit 200 or chip upon which the LDO circuit 200 is disposed.

As described above, each pass element of the second set of pass elements 206 may have an input terminal coupled to the output terminal of one of the pass elements of the first set of pass elements 204. Output terminals of each of the second set of pass elements 206 may be coupled to the LDO output (which carries the LDO output voltage $V_{OUT}$). In some embodiments, the first set of pass elements 204 and second set of pass elements 206 may form parallel paths between the supply voltage $V_{DDD}$ and the LDO output. For example, a first pass element of the first set of pass elements 204 that is coupled to a second pass element of the second set of pass elements 206 may form a first parallel path between the supply voltage $V_{DDD}$ and LDO output, and a third pass element of the first set of pass elements 204 that is coupled to a fourth pass element of the second set of pass elements 206 may form a second parallel path between the supply voltage $V_{DDD}$ and LDO output. A number of parallel paths formed by the first set of pass elements 204 and the second set of pass elements 206 may correspond to a number of bits of the thermocode representing the current voltage level of the supply voltage $V_{DDD}$. In at least one embodiment, the number of parallel paths formed by the first set of pass elements 204 and the second set of pass elements 206 may be equal to the number of bits of the thermocode representing the current voltage level of the supply voltage $V_{DDD}$.

An output of the amplifier 102 may be coupled to a switch 208. The output of the amplifier 102 may be referred to as the pg node. The switch may also be coupled to control terminals of each of the second set of pass elements 206. As such, the state of the switch (e.g., open or closed) may determine whether the parallel paths may be enabled such that current flows between the supply voltage $V_{DDD}$ and the LDO output. The switch 208 may be controlled by the signal FW_en. Thus, the signal FW_en may control whether the wakeup circuit 108 is enabled. In at least one embodiment, the wakeup circuit 108 may be considered to be "enabled" if one or more of the second set of pass elements 206 are enabled (e.g., allow current to flow between input and output terminals).

The wakeup circuit 108 may also include a flip-flop (FF) 210. The FF 210 may generate the signal FW_en. Upon receiving an indication that the LDO circuit 200 is to switch from standby mode to active mode (e.g., via a CSB signal, as illustrated), the LDO circuit 200 may switch the signal FW_en from a second state (when the wakeup circuit 108 is disabled) to a first state (when the wakeup circuit 108 is enabled. In at least one embodiment, the first state may be when the signal FW_en is HIGH (e.g., "1") and the second state may be when the signal FW_en is LOW (e.g., "0"). Transitioning the signal FW_en to the first state may cause the pg node to be discharged. An output of a comparator 212 may be coupled to an input of the FF 210. In at least one embodiment, the output of the comparator 212 may be coupled to a reset input of the FF 210. The comparator 212 may compare the LDO output voltage $V_{OUT}$ to a threshold voltage level. This threshold voltage level may be a predetermined voltage level based on parameters or characteristics of the LDO circuit 200, as described above with respect to FIG. 1. The threshold voltage level may be trimmable and dynamic based on environmental factors surrounding the LDO circuit 200. In at least one embodiment, the threshold voltage level may be greater than the LDO standby voltage level, but less than the LDO active voltage level. In embodiments where the breakdown voltage level of the LDO circuit 200 is significantly higher than the LDO active voltage level, the threshold voltage level may be equal to or greater than the LDO active voltage level. The comparator 212 may be enabled by the signal FW_en. Upon the LDO output voltage $V_{OUT}$ reaching the threshold voltage level, the comparator 212 trips and outputs a signal that resets the FF 210. Resetting the FF 210 may cause the signal FW_en to transition from the first state back to the second state, which may effectively disable the wakeup circuit 108. Transitioning the signal FW_en to the second state may also disable the comparator 212 and stop the discharge of the pg node.

According to embodiments, a transition to the active mode may not be dependent on an amount of time that the LDO circuit 200 is in the standby mode. A loop of the LDO circuit 100 formed by the comparator 212, being designed with replenished biases, can enable the LDO circuit 100 to quickly determine whether the LDO output voltage $V_{OUT}$ should jump to a higher voltage level or remain at a same voltage level (in the scenario that the LDO output transitions back to the active mode before the LDO output voltage $V_{OUT}$ falls to the standby mode voltage level). This determination can be done quickly (e.g., less than 2 nanoseconds (ns), 5 ns, 10 ns). This capability allows the LDO device 200 to quickly transition back to active mode after transitioning to the standby mode. Other conventional LDO designs are not able to transition from active mode after recently transitioning into standby mode. These conventional LDO designs may be dependent on a minimum amount of time required in standby mode before transitioning back to active mode.

Figure 3:
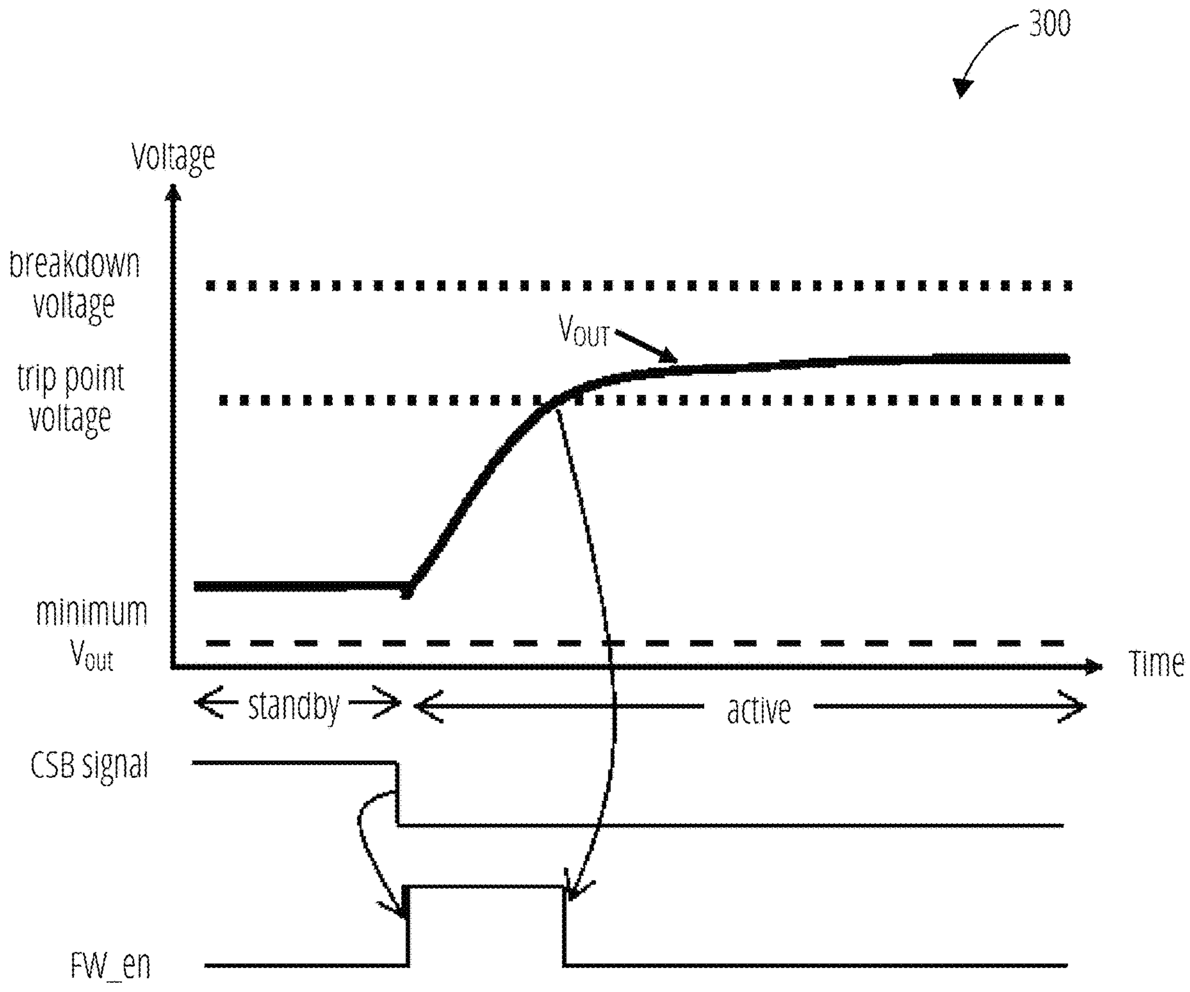
FIG. 3 is a graph illustrating a transient response of an output voltage of an LDO regulator circuit, according to one embodiment.

FIG. 3 is a graph 300 illustrating a transient response of an output voltage of an LDO circuit, according to one embodiment. The graph 300 may apply to one or more of the LDO circuit 100, the LDO circuit 200, or other circuits described herein. The graph 300 may illustrate a transition of an LDO output voltage $V_{OUT}$ between a lower LDO standby voltage level (e.g., first voltage level) and a greater LDO active voltage level (e.g., second voltage level). A vertical axis of the graph 300 may represent voltage, and a horizontal axis of the graph 300 may represent time. Below the horizontal axis, horizontal intervals may represent a standby mode interval and an active mode interval. The transition between standby and active mode intervals may be caused by a change in the CSB signal. This change in the CSB signal may indicate that the LDO circuit is to transition from standby mode to active mode, which in turn indicates that the LDO output voltage $V_{OUT}$ is to transition from the lower standby voltage level to the greater active voltage level. The change in the CSB signal may cause the signal FW_en to transition from the second state to the first state (which are described above), which may enable the wakeup circuit 108. Once the wakeup circuit 108 is enabled, the rate of transition of the LDO output voltage $V_{OUT}$ may be controlled by the wakeup circuit 108, which controls a peak current between the supply voltage $V_{DDD}$ and the LDO output based on the current voltage level of the supply voltage $V_{DDD}$.

Responsive to the LDO output voltage $V_{OUT}$ reaching the threshold voltage level (trip point voltage), the signal FW_en transitions from the first state to the second state and the wakeup circuit 108 is disabled. After the wakeup circuit 108 is disabled, normal operation of the LDO circuit may induce a lower rate of transition (i.e., shallower slope) than while the wakeup circuit 108 was enabled. However, by disabling the wakeup circuit 108 once the LDO output voltage $V_{OUT}$ reaches the threshold voltage level, the risk of the LDO output voltage $V_{OUT}$ reaching the breakpoint voltage is either reduced or eliminated.

Figure 4:
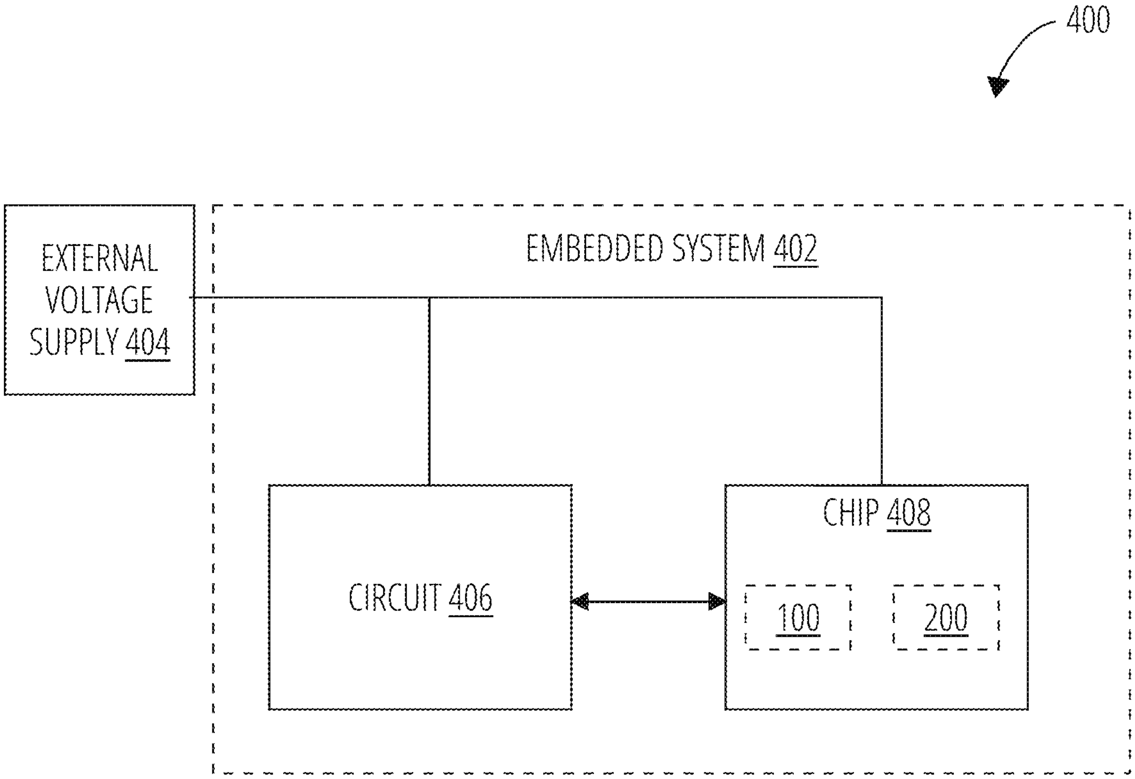
FIG. 4 illustrates a portion of a memory system, according to one embodiment.

FIG. 4 illustrates a portion of a system 400, according to one embodiment. The memory system 400 may include an embedded system 402 and an external voltage supply 404. The embedded system 402 may include a circuit 406 and an integrated circuit (IC) 408. The IC 408 may include an LDO circuit, such as the LDO circuit 100 or the LDO circuit 200.

The circuit 406 may be any circuitry that would benefit from power supply regulation provided by an LDO. For example, the circuit 406 may be a memory controller, a microcontroller, an ADC, a digital-to-analog converter (DAC), radio frequency (RF) components, amplifier(s), sensor interfaces, a field-programmable gate arrays (FPGA), voltage reference(s), flash memory circuitry, a display such as a light emitting diode (LED) display, audio circuitry, a power amplifier, a clock generator, a wireless module such as a wireless local area network (WLAN) module, or the like. The IC 408, via the LDO 110 and correction circuit 120, may provide voltage regulation to the circuit 406. In particular, the LDO circuit may help ensure that operations within the system 400 receive a stable, low-noise power supply, which may help maintain the integrity of data or signals handled by the circuit 406. Once enabled, the LDO circuit may transition from standby mode to active mode as described herein.

Figure 5:
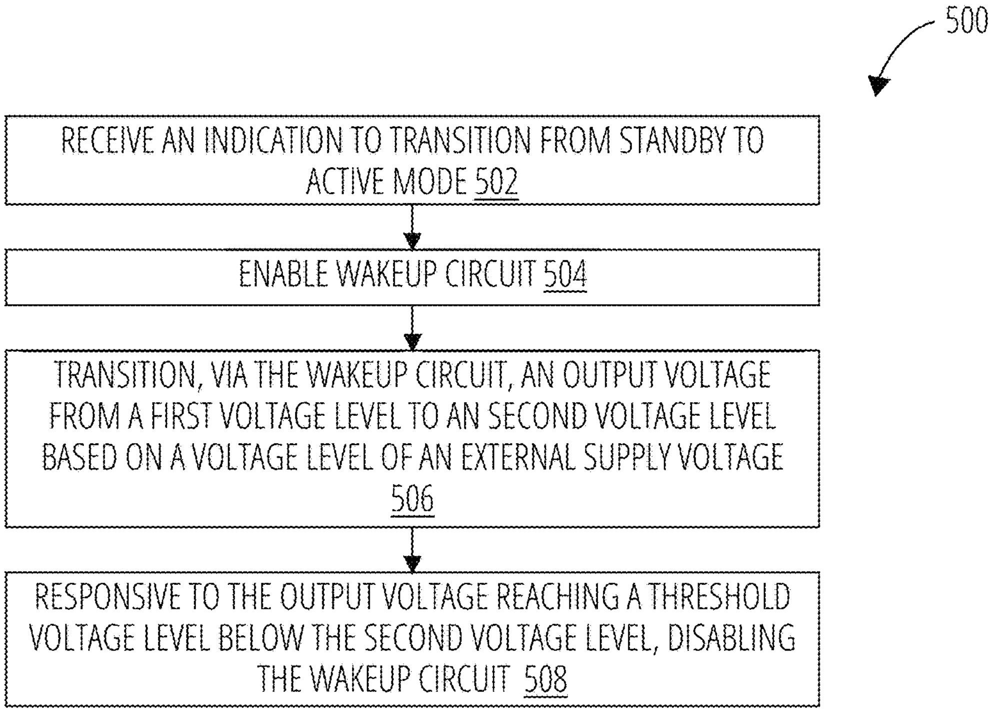
FIG. 5 is a flowchart illustrating a method of an LDO circuit transitioning from a standby mode to an active mode, according to one embodiment.

FIG. 5 is a flowchart illustrating a method 500 of an LDO circuit transitioning from a standby mode to an active mode, according to one embodiment. The method 500 may be performed by processing logic that may comprise hardware (e.g., circuitry, dedicated logic, programmable logic, microcode, etc.), software (e.g., instructions run on a processing device to perform hardware simulation), firmware, or a combination thereof. In at least one embodiment, the processing logic may refer to one or more portions or components of a device, such as a low dropout regulator (LDO) circuit (e.g., the LDO circuit 100 or the LDO circuit 200) or an embedded system (e.g, the embedded system 402) that includes an LDO circuit.

At block 502, the processing logic may receive an indication that an LDO circuit is to transition from a standby mode to an active mode.

At block 504, the processing logic may enable a wakeup circuit, such as the wakeup circuit 108. In at least one embodiment, the wakeup circuit may be enabled responsive to the LDO circuit transitioning from standby mode to active mode. The wakeup circuit may be enabled as described herein.

At block 506, the processing logic may transition, via the wakeup circuit, an LDO output voltage $V_{OUT}$ from a first voltage level (e.g., standby voltage level) to a second voltage level (e.g., active voltage level). In some embodiments, the wakeup circuit may transition the LDO output voltage $V_{OUT}$ based on a current voltage level of an external supply voltage $V_{DDD}$. The LDO output voltage $V_{OUT}$ may be transitioned from the first voltage level to the second voltage level as described herein, such as controlling a peak current during the transition by selectively enabling a number of parallel paths between the LDO output and the external supply voltage $V_{DDD}$.

At block 508, the processing logic may disable the wakeup circuit. The wakeup circuit may be disabled responsive to the LDO output voltage $V_{OUT}$ reaching a threshold voltage level. The threshold voltage level may be below the second voltage level. The wakeup circuit may be disabled as described herein.

Figure 6:
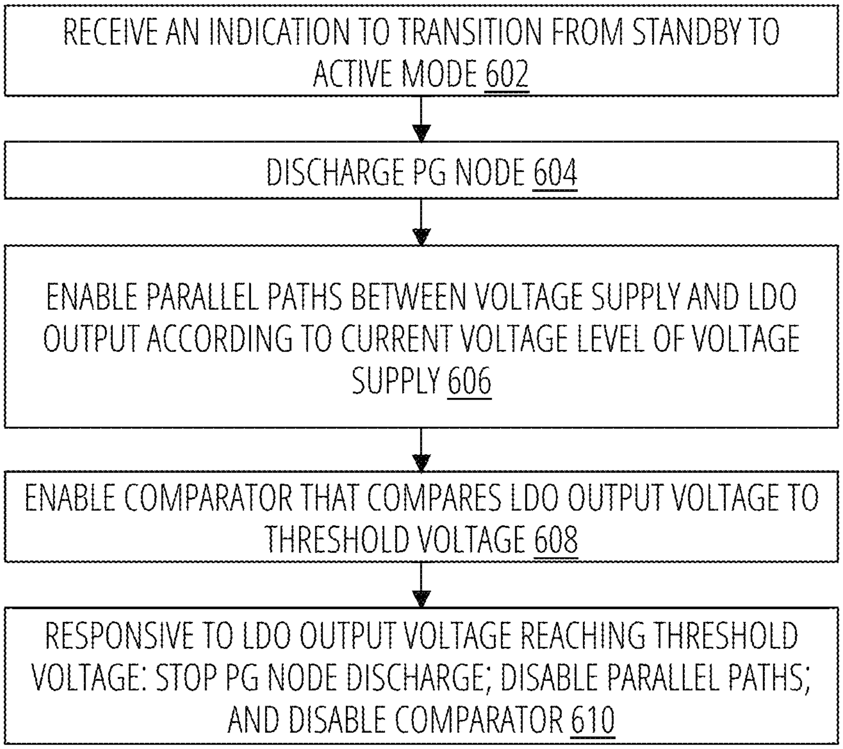
FIG. 6 is a flowchart illustrating a method of an LDO circuit transitions from a standby mode to an active mode, according to one embodiment.

FIG. 6 is a flowchart illustrating a method of an LDO circuit transitions from a standby mode to an active mode, according to one embodiment. The method 600 may be performed by processing logic that may comprise hardware (e.g., circuitry, dedicated logic, programmable logic, microcode, etc.), software (e.g., instructions run on a processing device to perform hardware simulation), firmware, or a combination thereof. In at least one embodiment, the processing logic may refer to one or more portions or components of a device, such as a low dropout regulator (LDO) circuit (e.g., the LDO circuit 100 or the LDO circuit 200) or an embedded system (e.g, the embedded system 402) that includes an LDO circuit.

At block 602, the processing logic may receive an indication that an LDO circuit is to transition from a standby mode to an active mode.

At block 604, the processing logic may discharge a node, such as the pg node described herein. In some embodiments, the node may be discharged responsive to the LDO transitioning from standby mode to active mode.

At block 606, the processing logic may enable a number of parallel paths between a supply voltage $V_{DDD}$ and an LDO output (which carries the LDO output voltage $V_{OUT}$). The number of parallel paths enabled may correspond to a current voltage level of a supply voltage $V_{DDD}$. The number of parallel paths may correspond to an effective impedance between the supply voltage $V_{DDD}$ and the LDO output. The processing logic may control a peak current flowing from the supply voltage $V_{DDD}$ to the LDO output while the LDO transitions from standby mode to active mode by enabling the number of parallel paths between the supply voltage $V_{DDD}$ and the LDO output. In some embodiments, the node is coupled to these control terminals responsive to the LDO transitioning from standby mode to active mode. The parallel paths may be enabled as described herein.

At block 608, the processing logic may enable a comparator that compare the LDO output voltage $V_{OUT}$ to a threshold voltage level. In some embodiments, the comparator is enabled responsive to the LDO transitioning from standby mode to active mode. The comparator may compare the LDO output voltage $V_{OUT}$ to the threshold voltage level as described herein.

At block 610, the processing logic may stop the discharge of the node, disable the parallel lines between the supply voltage $V_{DDD}$ and the LDO output, and disable the comparator. This may occur responsive to the LDO output voltage $V_{OUT}$ reaching the threshold voltage level.

In the above description, numerous details are set forth. It will be apparent, however, to one of ordinary skill in the art having the benefit of this disclosure, that embodiments of the present disclosure may be practiced without these specific details. In some instances, well-known structures and devices are shown in block diagram form, rather than in detail, in order to avoid obscuring the description. Additionally, in the above description, reference is made to the accompanying figures which form a part hereof, and in which is shown, by way of illustration, several embodiments of the present disclosure. It is understood that other embodiments may be utilized and structural changes may be made without departing from the scope of the present disclosure. The scope of the present disclosure can include, but is not limited to, controlling the peak current between voltage supply and LDO output voltage while the LDO output voltage transitions from a lower voltage level to a greater voltage level. The scope of the present disclosure can include, but is not limited to, disabling a wakeup circuit that causes a faster transition rate from the lower voltage level to the greater voltage level upon reaching a threshold voltage level.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "adjusting," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words “example” or “exemplary” are used herein to mean serving as an example, instance or illustration. Any aspect or design described herein as “example’ or “exemplary” is not necessarily to be construed as preferred or advantageous over other aspects or designs. Rather, the use of the words “example” or “exemplary” is intended to present concepts in a concrete fashion. As used in this application, the term “or” is intended to mean an inclusive “or” rather than an exclusive “or.” That is, unless specified otherwise, or clear from context, “X includes A or B” is intended to mean any of the natural inclusive permutations. That is, if X includes A; X includes B; or X includes both A and B, then “X includes A or B” is satisfied under any of the foregoing instances. In addition, the articles “a” and “an” as used in this application and the appended claims should generally be construed to mean “one or more” unless specified otherwise or clear from context to be directed to a singular form. Moreover, use of the term “an embodiment” or “one embodiment” or “some embodiments” throughout is not intended to mean the same embodiment or embodiments unless described as such.

Embodiments described herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term “computer-readable storage medium” should be taken to include a single medium or multiple media (e.g., a centralized or distributed database and/or associated caches and servers) that store one or more sets of instructions. The term “computer-readable medium” shall also be taken to include any medium capable of storing, encoding, or carrying a set of instructions for execution by the machine and that causes the machine to perform any one or more of the methodologies of the present embodiments. The term “computer-readable storage medium” shall accordingly be taken to include, but not be limited to, solid-state memories, optical media, magnetic media, and any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details, such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or presented in simple block diagram format to avoid unnecessarily obscuring the present disclosure. Thus, the specific details set forth above are merely exemplary. Particular embodiments may vary from these exemplary details and still be contemplated to be within the scope of the present disclosure.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

In the above description, for purposes of explanation, numerous specific details are set forth in order to provide a thorough understanding of the present disclosure. It will be evident, however, to one skilled in the art that the present disclosure may be practiced without these specific details. In other instances, well-known circuits, structures, and techniques are not shown in detail, but rather in a block diagram in order to avoid unnecessarily obscuring an understanding of this description.

Reference in the description to “one embodiment,” “an embodiment,” or “some embodiments” means that a particular feature, structure, or characteristic described in connection with the embodiment(s) is included in at least one embodiment of the disclosure. The phrase “in one embodiment” or “in some embodiments” located in various places in this description does not necessarily refer to the same embodiment(s).

What is claimed is:

1. A circuit comprising:
- an error amplifier configured to regulate an output voltage of the circuit;
- a wakeup circuit coupled to the error amplifier, the wakeup circuit to control a peak current during a transition of the output voltage from a first voltage level to a second voltage level based on a third voltage level of a supply voltage; and
- a comparator to compare the output voltage to a threshold voltage level, wherein a signal corresponding to an output of the comparator is to disable the wakeup circuit.

2. The circuit of claim 1, wherein the wakeup circuit is to control the peak current by selectively adjusting an effective impedance between the voltage supply and an output of the circuit.

3. The circuit of claim 1, wherein the wakeup circuit comprises:
- a first set of pass elements each comprising an input terminal configured to receive the supply voltage, wherein a number of pass elements of the first set that is enabled at a first time is based on the third voltage level.

4. The circuit of claim 3, wherein each pass element of the first set comprises a control terminal coupled to one of a plurality of parallel lines that are configured to provide a thermometer code corresponding to the third voltage level.

5. The circuit of claim 3, wherein each pass element of the first set each comprises an output terminal, and wherein the wakeup circuit further comprises:
- a second set of pass elements each comprising an input terminal configured to couple to one of the output terminals of the pass elements of the first set.

6. The circuit of claim 5, wherein the circuit further comprises:

a switch coupled between control terminals of pass elements of the second set and an output of the error amplifier.

7. The circuit of claim 1, wherein the signal is to selectively discharge the output of the error amplifier.

8. The circuit of claim 1, wherein an output of the comparator is coupled to a reset input of a flip-flop, and wherein the signal is generated by the flip-flop.

9. The circuit of claim 1, wherein the wakeup circuit is disabled responsive to the output voltage reaching a threshold voltage level.

10. A system comprising:

a memory controller; and a chip comprising a low dropout regulator (LDO) circuit, the LDO circuit comprising:

an error amplifier configured to regulate an output voltage of the circuit;

a wakeup circuit coupled to the error amplifier, the wakeup circuit to control a peak current during a transition of the output voltage from a first voltage level to a second voltage level based on a third voltage level of a supply voltage; and a comparator to compare the output voltage to a threshold voltage level, wherein a signal corresponding to an output of the comparator is to disable the wakeup circuit.

11. The system of claim 10, wherein the wakeup circuit is to control the peak current by selectively adjusting an effective impedance between the voltage supply and an output of the circuit.

12. The system of claim 10, wherein the wakeup circuit comprises:

a first set of pass elements each comprising an input terminal configured to receive the supply voltage, wherein a number of pass elements of the first set that is enabled at a first time is based on the third voltage level.

13. The system of claim 12, wherein each pass element of the first set comprises a control terminal coupled to one of a plurality of parallel lines that are configured to provide a thermometer code corresponding to the third voltage level.

14. The system of claim 12, wherein each pass element of the first set each comprises an output terminal, and wherein the wakeup circuit further comprises:

a second set of pass elements each comprising an input terminal configured to couple to one of the output terminals of the pass elements of the first set.

15. The system of claim 12, wherein the circuit further comprises:

a switch coupled between control terminals of pass elements of the second set and an output of the error amplifier.

16. The system of claim 10, wherein an output of the comparator is coupled to a reset input of a flip-flop, and wherein the signal is generated by the flip-flop.

17. The system of claim 10, wherein the wakeup circuit is disabled responsive to the output voltage reaching a threshold voltage level.

18. A method, comprising:

receiving an indication that a low dropout regulator (LDO) circuit is to transition from a standby mode to an active mode;

responsive to receiving the indication, enabling a wakeup circuit;

transitioning, via the wakeup circuit, an output voltage of the LDO from a first voltage level to a second voltage level, wherein the wakeup circuit transitions the output voltage from the first voltage level to the second voltage level based on a current voltage level of an external supply voltage;

comparing, using a comparator, the output voltage to a threshold voltage level and generating a signal corresponding to an output of the comparator; and responsive to the signal received from the comparator, disabling the wakeup circuit.

* * * * *